United States Patent
Yun et al.

(10) Patent No.: US 6,958,875 B2
(45) Date of Patent: Oct. 25, 2005

(54) METHOD AND APPARATUS PROVIDING A SELF-VACCINE FOR A DISK DRIVE

(75) Inventors: Jong Yun Yun, Cupertino, CA (US); Yeong Kyun Lee, San Jose, CA (US); Kang Seok Lee, San Jose, CA (US); Ho In Sou, San Gabriel, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 126 days.

(21) Appl. No.: 10/376,082

(22) Filed: Feb. 27, 2003

(65) Prior Publication Data

US 2004/0169953 A1 Sep. 2, 2004

(51) Int. Cl.[7] ............................................. G11B 5/03
(52) U.S. Cl. ........................................ 360/66; 360/67
(58) Field of Search .............................. 360/66–69, 31, 360/25, 60, 46, 53, 97.02; 714/774, 704, 721, 769; 324/685, 760, 212–226

(56) References Cited

U.S. PATENT DOCUMENTS 5,005,089 A * 4/1991 Thanos et al. ........... 360/77.08
6,052,804 A * 4/2000 Thowe et al. ............... 714/710
6,643,081 B1 * 11/2003 Walker et al. ................ 360/31

* cited by examiner

Primary Examiner—David Hudspeth
Assistant Examiner—Jason Olson
(74) Attorney, Agent, or Firm—Gregory Smith & Associates; Jeffrey P. Aiello; Earle Jennings (57) ABSTRACT

A self-vaccine as used herein will refer to methods of operating a disk drive and the apparatus implementing such methods, which make the disk drive immune to changes in temperature, that keep the disk drive healthy when hot or cold. The invention includes a self-vaccine extending the read channel optimization parameter database of a track zone or sequence to test temperature ranges actually found in the user's operation of the disk drive. The invention also includes the self-vaccine updating the read channel optimization parameter database for an already tested temperature range, whenever there has been sufficient time passed since the read channel optimization was performed for that temperature range. The invention includes read channel optimized parameters for at least temperature ranges within the embedded disk controller, which are updated in the user's operating environment during idle time providing the self-vaccine. The invention includes disk drives including a self-vaccine method.

22 Claims, 6 Drawing Sheets

METHOD AND APPARATUS PROVIDING A SELF-VACCINE FOR A DISK DRIVE

TECHNICAL FIELD

This invention relates to the optimization of performance in assembled disk drives in the environment(s) in which they are used.

BACKGROUND ART

Assembled disk drives are calibrated after assembly by a process known as read channel optimization. Read channel optimization is a self-test burn-in procedure, which is usually done at the point of manufacture for a disk drive. It is usually performed at a single temperature or temperature range, often between about 25° C. to 30° C. The inventors have found that the current RCO procedures lead to some problems for customers. Customers use disk drives at temperatures which may range from 0° C. to 55° C., and sometimes, beyond this temperature range. Before discussing the details of these problems, a general discussion of disk drive technology is useful.

The Tracks Per Inch (TPI) in disk drives is rapidly increasing, leading to smaller and smaller track positional tolerances. The track position tolerance, or the offset of the read-write head from a track, is monitored by a signal known as the head Positional Error Signal (PES). Reading a track successfully usually requires minimizing read-write head PES occurrences.

Figure 1A:
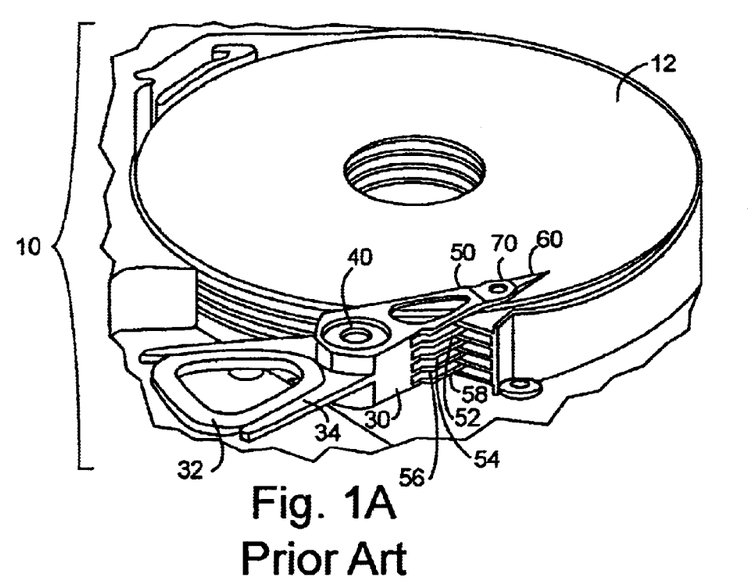
FIG. 1A illustrates a typical prior art high capacity disk drive 10 including actuator arm 30 with voice coil 32, actuator axis 40, actuator arms 50–58 and with head gimbal assembly 60 placed among the disks.

FIG. 1A illustrates a typical prior art high capacity disk drive 10 including actuator arm 30 with voice coil 32, actuator axis 40, actuator arms 50–58 and with head gimbal assembly 60 placed among the disks.

Figure 1B:
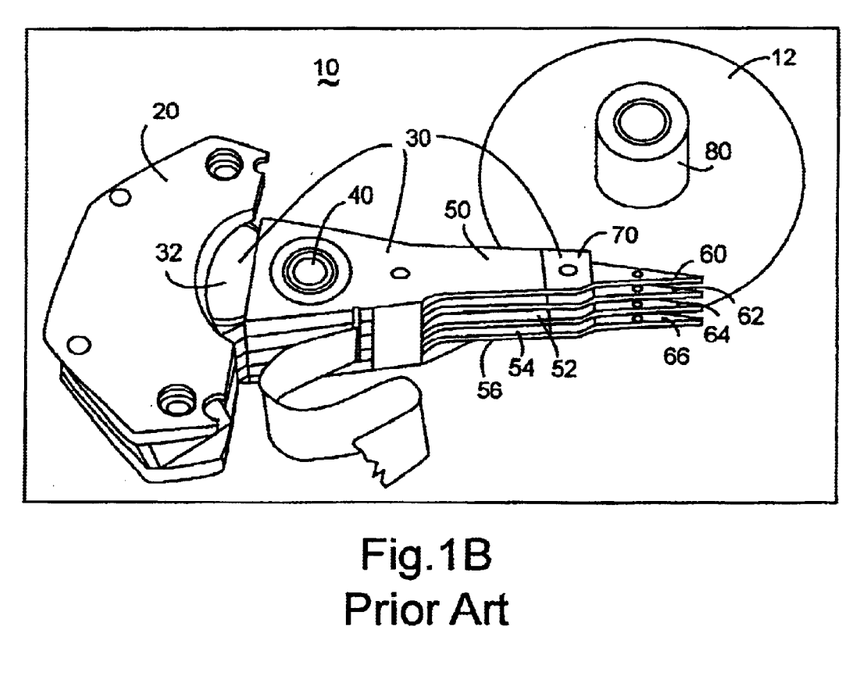
FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.

FIG. 1B illustrates a typical prior art, high capacity disk drive 10 with actuator 20 including actuator arm 30 with voice coil 32, actuator axis 40, actuator arms 50–56 and head gimbal assembly 60–66 with the disks removed.

Figure 2A:
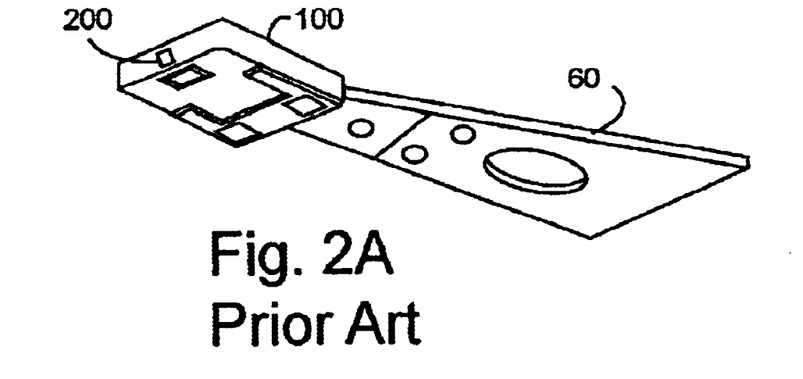
FIG. 2A illustrates a suspended head gimbal assembly 60 containing the MR read-write head 200 of the prior art.

FIG. 2A illustrates a suspended head gimbal assembly 60 containing the MR read-write head 200 of the prior art.

Since the 1980's, high capacity disk drives 10 have used voice coil actuators 20–66 to position their read-write heads over specific tracks. The heads are mounted on head gimbal assemblies 60–66, which float a small distance off the disk drive surface when in operation. The air bearing referred to above is the flotation process. The air bearing is formed by the rotating disk surface 12, as illustrated in FIGS. 1A–1B, and slider head gimbal assembly 60, as illustrated in FIGS. 1A–2A.

Often there is one head per head slider for a given disk drive surface. There are usually multiple heads in a single disk drive, but for economic reasons, usually only one voice coil actuator.

Voice coil actuators are further composed of a fixed magnet actuator 20, interacting with a time varying electromagnetic field induced by voice coil 32, to provide a lever action via actuator axis 40. The lever action acts to move actuator arms 50–56 positioning head gimbal assemblies 60–66 over specific tracks with speed and accuracy. Actuators 30 are often considered to include voice coil 32, actuator axis 40, actuator arms 50–56 and head gimbal assemblies 60–66. An actuator 30 may have as few as one actuator arm 50. A single actuator arm 52 may connect with two head gimbal assemblies 62 and 64, each with at least one head slider.

Head gimbal assemblies 60–66 are typically made by rigidly attaching a slider 100 to a head suspension, including a flexure providing electrical interconnection between the read-write head in the slider and the disk controller circuitry. The head suspension is the visible mechanical infrastructure of 60–66 in FIGS. 1A to 2A. Today, head suspension assemblies are made using stainless steal in their suspension and beams. The head suspension is a steel foil placed on a steel frame, coated to prevent rust. It is then coated with photosensitive material. The suspension and flexures are photographically imprinted on the photosensitive material, which is then developed. The developed photo-imprinted material is then subjected to chemical treatment to remove unwanted material, creating the raw suspension and flexure.

Actuator arms 50–56 are typically made of extruded aluminum, which is cut and machined.

Figure 2B:
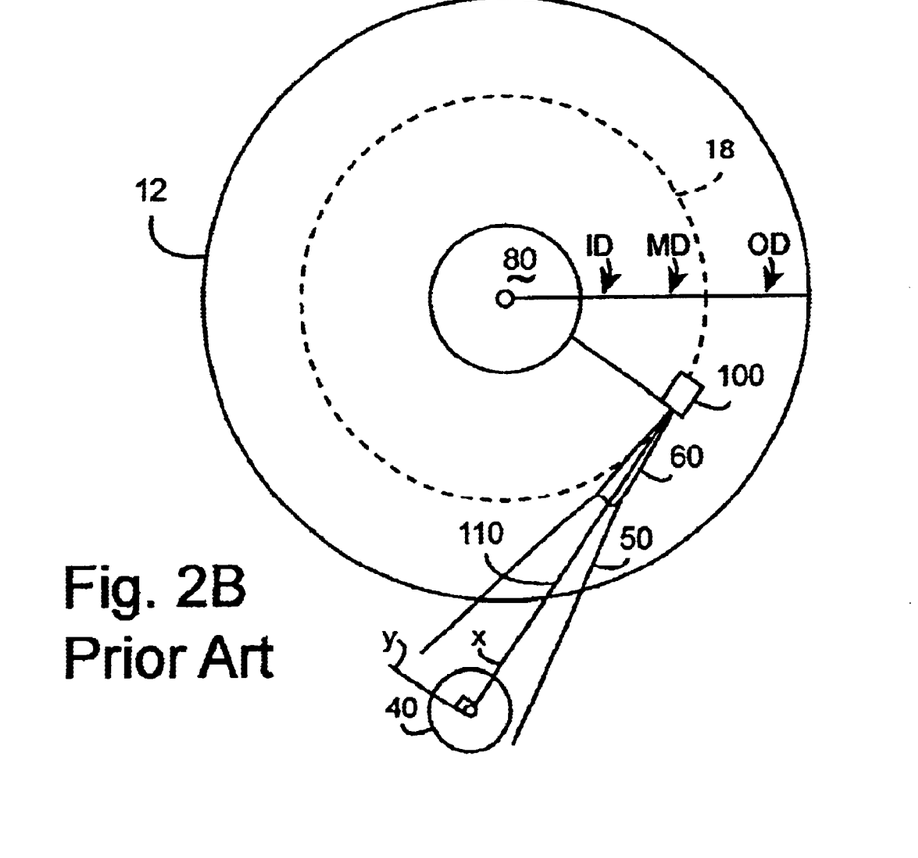
FIG. 2B illustrates the relationship between the principal axis 110 of an actuator arm 50 containing head gimbal assembly 60, which in turn contains slider 100, with respect to a radial vector 112 from the center of rotation of spindle hub 80 as found in the prior art.

FIG. 2B illustrates the relationship between the principal axis 110 of an actuator arm 50, with respect to a radial vector 112 from the center of rotation of spindle hub 80 as found in the prior art.

The actuator arm assembly 50–60–100, pivots about actuator axis 40, changing the angular relationship between the radial vector 112 and the actuator principal axis 110. Typically, an actuator arm assembly 50–60–100 will rotate through various angular relationships. The farthest inside position is often referred to as the Inside Position denoted herein as ID. The position where radial vector 112 approximately makes a right angle with 110 is often referred to as the Middle Position, denoted herein as MD. The farthest out position where the read-write head 100 accesses disk surface 12 is often referred to as the Outside Position, denoted herein as OD.

Note that as illustrated in FIG. 2B, the X axis is preferably situated along the principal axis 110 of the actuator arm. The Y axis preferably intersects the X axis at essentially the actuator pivot 40. When the actuator positions the slider 100 so that the read-write head 200 is at MD, the radial vector 112 is essentially parallel the Y axis. Track 18 is shown near MD, but it should be noted that tracks exist from ID to OD, through out the disk surface 12.

Figure 2C:
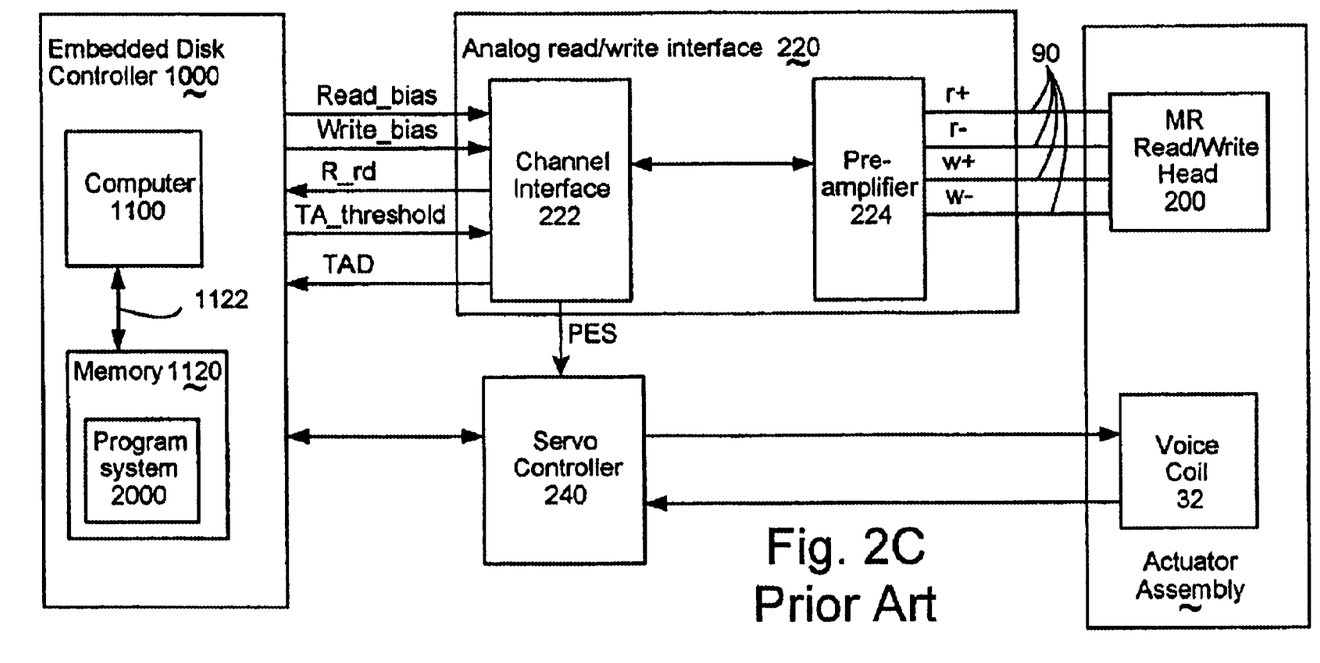
FIG. 2C illustrates a simplified schematic of a disk drive controller 1000 of the prior art, used to control an assembled disk drive 10.

FIG. 2C illustrates a simplified schematic of a disk drive controller 1000 of the prior art, used to control an assembled disk drive 10.

Disk drive controller 1000 controls an analog read-write interface 220 communicating resistivity found in the spin valve within read-write head 200.

Analog read-write interface 220 frequently includes a channel interface 222 communicating with pre-amplifier 224. Channel interface 222 receives commands, from embedded disk controller 100, setting at least the read_bias and write_bias.

Various disk drive analog read-write interfaces 220 may employ either a read current bias or a read voltage bias. By way of example, the resistance of the read head is determined by measuring the voltage drop (V_rd) across the read differential signal pair (r+ and r−) based upon the read bias current setting read_bias, using Ohm's Law. From hereon, the assumption will be that a read current bias is used. This is done to simplify the discussion, and is not meant to limit the scope of the claims.

Typically, channel interface 222 includes amplifying the difference in the read differential signals. The amplified difference is then adjusted to remove asymmetries in voltage swings. The output of the asymmetry adjustment circuit is then presented to a first filter. The first filter is controlled by a first cut-off frequency and also provides boost to further remove high frequency noise. Often, the filtered signal is then demultiplexed into a track servo signal and a data signal. Both the track servo signal and data signal are independently filtered and amplified. There are various points in which the signal enters the digital realm from analog, depending upon the specifics of the channel interface 222.

In FIG. 2C, channel interface 222 also provides a Position Error Signal PES to at least servo controller 240. The PES signal is used by servo controller 240 to control voice coil 32 to keep read-write head 200 close enough to a track 18 of FIG. 2B to support read-write head 200 communicatively accessing track 18.

It is now time to discuss read channel optimization. Read channel optimization is a self-test burn-in procedure, which is usually done at the point of manufacture for a disk drive. It is usually performed at a single temperature or temperature range, often between about 25° C. to 30° C.

Read channel optimization establishes optimal values for at least the following for each of a collection of track zones:

Write current and write current overshoot controls.

Read bias current.

Read channel gain, used to control amplification of the read channel analog signal.

Read channel filter cut-off frequency Fc.

Asymmetric balancing, so that the positive and negative swings of the read channel signal are balanced.

The filtered read channel signal, a servo track signal and a data channel signal.

FIR taps, typically 10 taps applied to at least one digitized stream, of the raw read channel, the demultiplexed data stream, and/or servo track stream. Typically, the FIR is applied to the digitized raw read channel stream before presenting the stream to a trellis decoder.

Trellis decoder seed values, initializing the track decoding of the filtered digitized stream based upon synchronization with a detected track header.

Servo track threshold values and filter cut-off frequencies.

A track zone is a sequence of neighboring tracks. The collection of track zones encompass all the tracks of a disk surface with each track typically belonging to just one track zone. The disk drive accessing a track within a track zone is based upon the read channel optimized parameters, for that track zone.

Channel Statistical Measurements (CSM) are a standard system used in assembled disk drives to estimate channel quality, by measuring amplitude. Another quality measure is to determine the Bit Error Rate (BER). The track servo signal, various synchronization mark detection measures and error control coding estimates are often used to generate CSM. While BER is considered more accurate, CSM and BER have a strong correlation, making it possible to infer the BER closely from CSM measurements.

CSM is directly related to the channel characteristics, whereas BER is a higher level systems reliability/quality measure. Today, CSM has an advantage in built-in self test situations, in that channel interfaces can often automatically calculate CSM from relatively small test runs, whereas it takes much longer test runs for BER calculations to reach the same level of accuracy.

Consider an example situation where Fc is being tested. After tests of 1000 reads of the same track, one error is reported for Fc of 10 MHz, and two errors are reported for Fc of 12 MHz. The BER estimates are almost identical, because statistically, there is almost no difference in these results. However, for Fc=10 MHz, CSM is 423, and for Fc=12 MHz, CSM is 5023. These CSM figures indicate quickly that Fc=10 MHz is definitely preferred. To reach the same conclusion would take much longer for the BER approach.

By way of example, suppose the read channel optimization temperature was 25° C. Disk drives commonly include the ability to measure their operating temperature and use this capability to apply these heuristic formulas. When the temperature varies greatly from 25° C., many disk drive controllers 1000 will use a heuristic formula to alter one or more parameters based upon the operating temperature. While this is often better than doing nothing, the actual disk drive and its relationship with its environment are not taken into account.

One typical heuristic involves Write Current. Suppose the read channel optimization parameter for write current is 20 mA. A typical heuristic is to use a write current 5 mA higher for low temperatures and 5 mA lower for high temperatures. There are disk drives where this heuristic is not even close to the actual optimal values. Using a single heuristic does not take into account the actual disk drive.

Another example includes the cut-off frequency, Fc. Fc can vary from 10 MHz at 55° C. to 12 MHz at 25° C. to 18 MHz at 0° C. in some disk drives, and in others vary by less than 2 MHz across the entire operational temperature.

Note that disk drives are used in computers, which may experience temperatures well below zero or well above 55° C. Disk drive manufacturers cannot tell what environmental conditions a specific disk drive will encounter, at the point of manufacture. Additionally, a disk drive's operating environment may change dramatically over time.

The cost of test, and the uncertainty of the eventual environment a disk drive will be used in, preclude the utility of expensive extension of read channel optimization over several temperature ranges. Some disk drives are never subjected to freezing temperatures, while others never experience any temperature above room temperature in an air-conditioned office building. What is needed is a way to tune disk drive performance to match the operating environment, without raising the cost of testing the manufactured disk drive.

The inventors do not know of any manufacturer who has satisfied this need. The standard approach to this situation is for manufacturers to test disk drives under the worst case situations, which are considered to be extreme heat. If the disk drive performs adequately, it is shipped. While such an approach is to be commended for insuring the disk drives are operational when shipped, it has several limitations.

Disk drives are affected by temperature differently, particularly as the track densities and/or rotational rates increase. Different components respond to temperature in different ways. Testing at extreme heat does not address the effect of low temperature on the read-write head and air bearing upon which the read-write head flies over the rotating disk surface. The interface between air bearing, read-write head, and disk surface is affected differently from the permeability of the disk surface, for example.

It is a commonly observed fact that at least mechanical systems degrade over time. Initial read channel optimized values, which are the best values the manufacturers can provide at time of manufacture, have been found to no longer be optimal when the disk drive has aged several months or years. What is needed is a method updating the read channel optimization parameters to address the aging of a disk drive at the point of use.

To summarize, what is needed is a way to tune disk drive performance to match the operating environment, without raising the cost of testing the manufactured disk drive. What is also needed is a method updating the read channel optimization parameters to address the aging of a disk drive at the point of use.

SUMMARY OF THE INVENTION

Aspects of the invention address problems discussed in the background.

A self-vaccine as used herein will refer to methods of operating a disk drive and the apparatus implementing such methods, which make the disk drive immune to changes in temperature, that keep the disk drive healthy when hot or cold and/or optimize performance as the disk drive ages.

The invention includes a self-vaccine extending the read channel optimization parameter database of a track zone or sequence to test temperature ranges actually found in the user's operation of the disk drive. This self-vaccine provides optimized performance based upon the user's operating environment, which may differ greatly from the manufacturer's testing environment.

The invention also includes the self-vaccine updating the read channel optimization parameter database for an already tested temperature range, whenever there has been sufficient time passed since the read channel optimization was performed for that temperature range. The self-vaccine in such situations insures that the disk drive is operated even as the disk drive ages.

The invention includes read channel optimized parameters for at least temperature ranges within the embedded disk controller, which are updated in the user's operating environment during idle time providing the self-vaccine.

The invention includes disk drives including a self-vaccine method. Such self-vaccinated disk drives will automatically adjust to the encountered operating temperatures and/or aging, increasing reliability and life expectancy.

These and other advantages of the present invention will become apparent upon reading the following detailed descriptions and studying the various figures of the drawings.

DETAILED DESCRIPTION OF THE INVENTION

The invention tunes the parameters of at least read channel optimization based upon the actual environment of use, which cannot be known at the time of manufacture.

A self-vaccine as used herein will refer to methods of operating a disk drive and the apparatus implementing such methods, which make the disk drive immune to changes in temperature, that keep the disk drive healthy when hot or cold. A self-vaccine optimizes disk drives in terms of their age.

The invention includes a self-vaccine extending the read channel optimization parameter database of a track zone or sequence to test temperature ranges actually found in the user's operation of the disk drive. This self-vaccine provides optimized performance based upon the user's operating environment, which may differ greatly from the manufacturer's testing environment.

The invention also includes the self-vaccine updating the read channel optimization parameter database for an already tested temperature range, whenever there has been sufficient time passed since the read channel optimization was performed for that temperature range. The self-vaccine in such situations insures that the disk drive operation remains optimal even as the disk drive ages.

Figure 3:
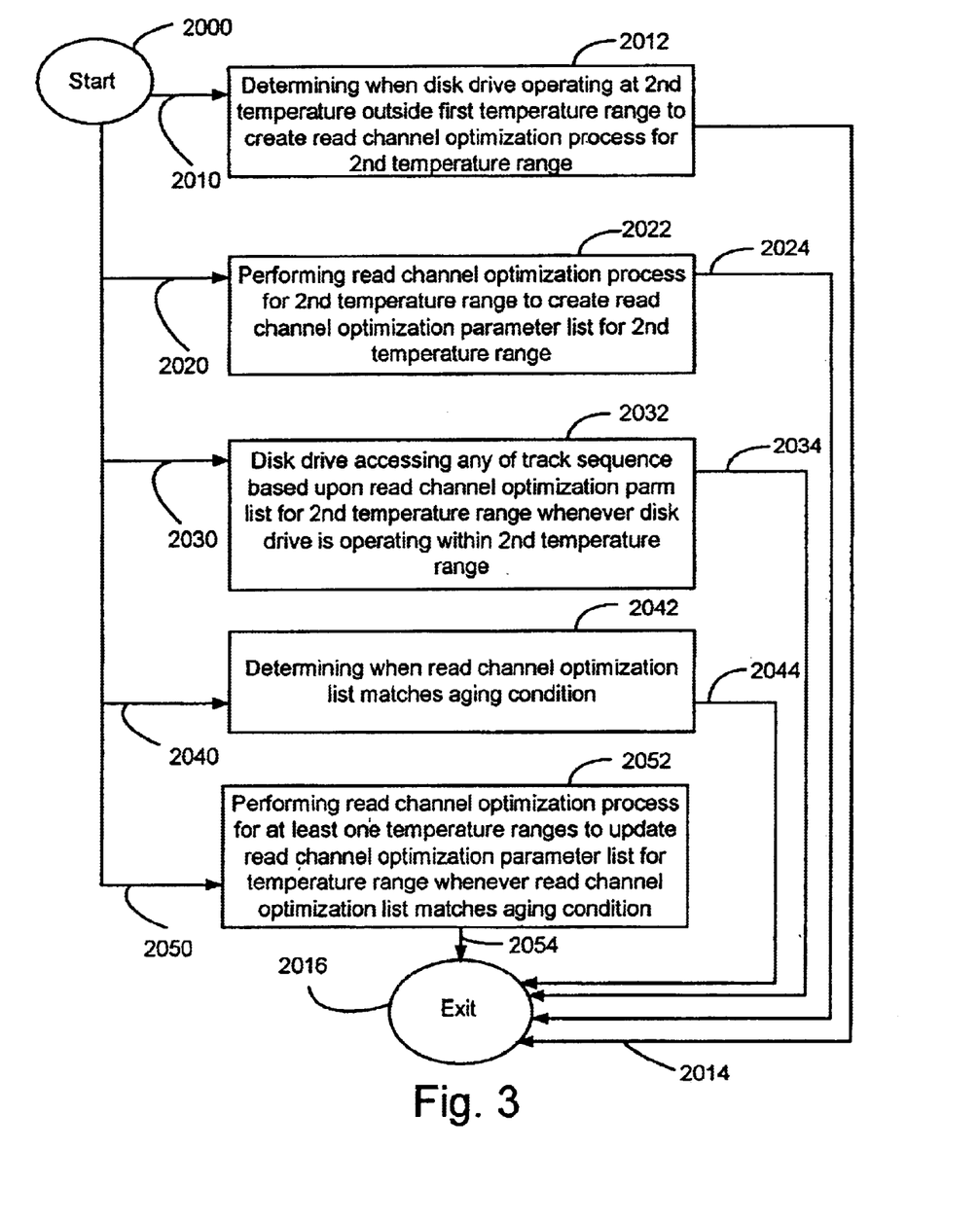
FIG. 3 illustrates a process for self-vaccination of a disk drive possessing a read channel optimization for a first temperature range.

FIG. 3 is a detail flowchart of program system 2000 of FIG. 2C illustrating self-vaccination of a disk drive 10, possessing a read channel optimization for a first temperature range.

Operation 2012 performs determining the disk drive operating at a second temperature outside the first temperature range to create a read channel optimization process for the second temperature range.

Operation 2022 performs performing the read channel optimization process for the second temperature range to create a read channel optimization parameter list for the second temperature range.

Operation 2032 performs the disk drive accessing any of the tracks belonging to the track sequence on the disk surface based upon the read channel optimization parameter list for the second temperature range whenever the disk drive is operating within the second temperature range.

Operation 2042 performs determining when the read channel optimization list matches an aging condition.

Operation 2052 performs performing the read channel optimization process for at least one of the temperature ranges to update the read channel optimization parameter list for the temperature range whenever the read channel optimization list matches the aging condition.

Note that the method of operating disk drive illustrated in FIG. 3 may be implemented by means using one or more of the following: A channel interface, a computer, a memory accessibly coupled to the computer, a finite state machine, and an amplifier. The memory may be comprised of a volatile memory component and a non-volatile memory component. The non-volatile memory component may further include at least a version of the read channel optimization.

The aging condition pertains to at least one of a time-from-manufacture condition and a time-from-last-update condition.

The read channel optimizations for the first temperature range and for the second temperature ranges are both applicable to a sequence of at least two tracks on a disk surface within the disk drive.

Each read channel optimization parameter list contains at least one member of a read channel parameter collection.

The invention includes read channel optimized parameters for at least temperature ranges within the embedded disk controller, which are updated in the user's operating environment during idle time providing the self-vaccine.

Many contemporary computers enter an idle state after their disk drives have not been actively used for a time, which is often set by the operating system. The idle state often lasts for a number of minutes, before the drive motors are turned off, when the computer enters standby mode. The inventors have discovered that this idle time can be used to perform the read channel optimization process.

Figure 4A:
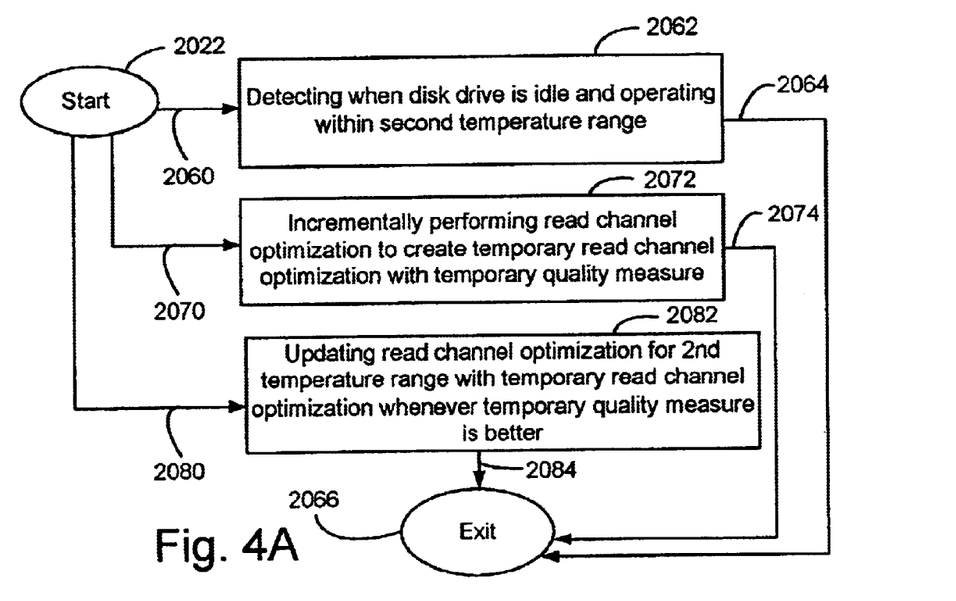
FIG. 4A illustrates a read channel optimization process.

FIG. 4A is a detail flowchart of operation 2022 of FIG. 3 further illustrating the read channel optimization process.

Operation 2062 performs detecting when disk drive is idle and operating within the second temperature range. Operation 2072 performs incrementally performing read channel optimization whenever disk drive is idle and operating within the second temperature range to create a temporary read channel optimization with a temporary quality measure. Operation 2082 performs updating the read channel optimization for the second temperature range with the temporary read channel optimization whenever the temporary quality measure is better than a current quality measure for the track sequence.

Figure 4B:
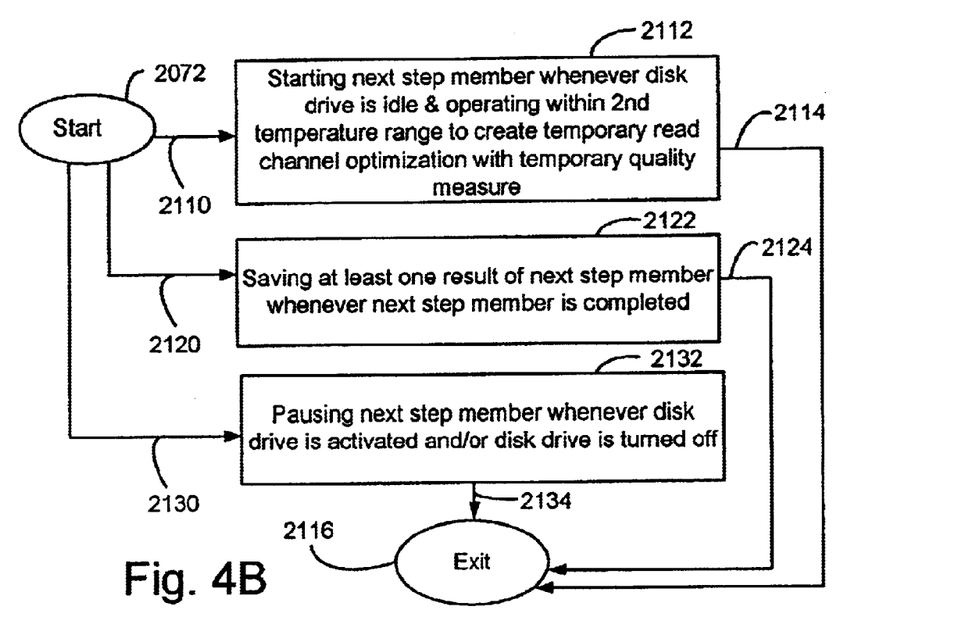
FIG. 4B illustrates an incrementally performed read channel optimization process.

FIG. 4B is a detail flowchart of operation 2072 of FIG. 4A further illustrating incrementally performing read channel optimization.

Operation 2112 performs starting a next step member whenever the disk drive is idle and operating within the second temperature range to create a temporary read channel optimization with a temporary quality measure. Operation 2122 performs saving at least one result of the next step member whenever the next step member is completed. Operation 2132 performs pausing the next step member whenever the disk drive is activated and/or the disk drive is turned off.

As used herein, the disk drive is activated if the disk drive is requested to access at least one of its disk surfaces.

Figure 5A:
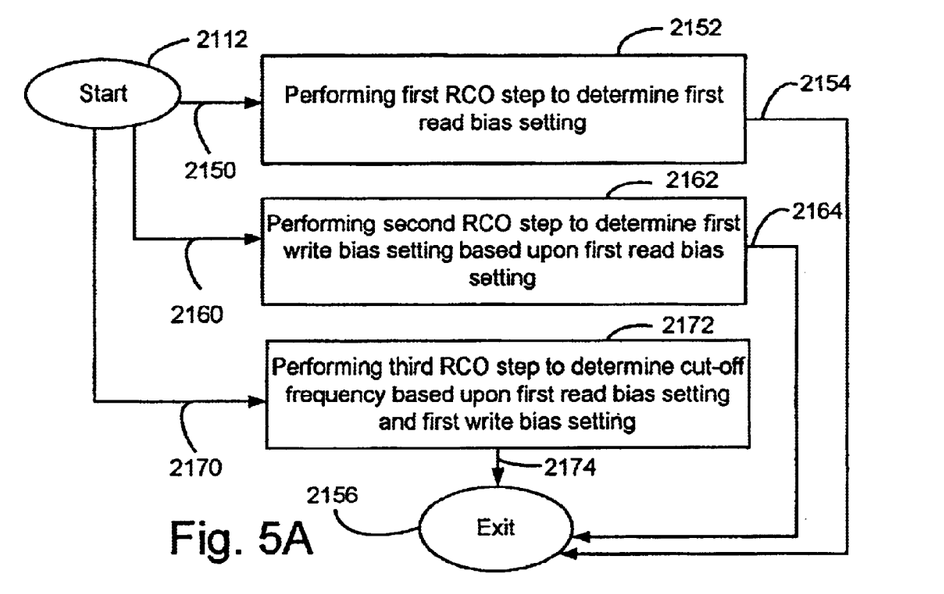
FIG. 5A illustrates a next step collection process.

FIG. 5A is a detail flowchart of operation 2112 of FIG. 4B further illustrating the next step collection.

Operation 2152 performs a first RCO step to determine a first read bias setting. Operation 2162 performs a second RCO step to determine a first write bias setting based upon the first read bias setting. Operation 2172 performs a third RCO step to determine a cut-off frequency based upon the first read bias setting and the first write bias setting.

The invention includes disk drives including a self-vaccine method. Such self-vaccinated disk drives will automatically adjust to the encountered operating temperatures and/or aging, increasing reliability and life expectancy.

Figure 5B:
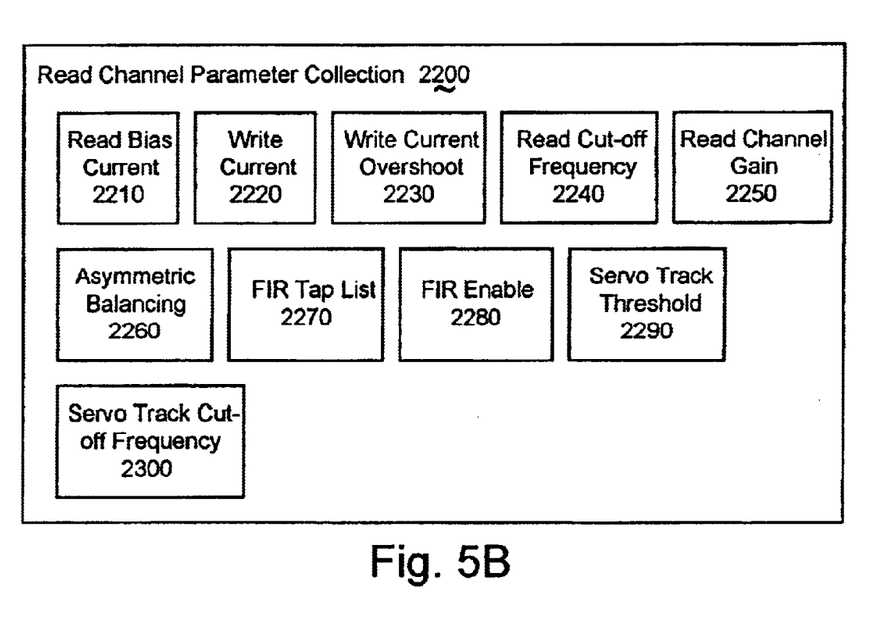
FIG. 5B illustrates a read channel parameter collection process.

FIG. 5B illustrate the read channel parameter collection 2200, which may reside in the accessibly coupled memory 1120 of FIG. 2C.

The read channel parameter collection 2200 includes the following: read bias current 2210, write current 2220, write current overshoot control 2230, read channel cut-off frequency 2240, read channel amplification gain 2250, asymmetric balancing control 2260, FIR tap list 2270, FIR enable 2280, servo track threshold value 2290, and servo track filter cut-off frequency 2300.

The preceding embodiments have been provided by way of example and are not meant to constrain the scope of the following claims.

What is claimed is:

1. A mechanism of self-vaccination providing optimized read channel parameters for a disk drive possessing a read channel optimization for a first temperature range, comprising:

means for determining said disk drive operating at a second temperature outside said first temperature range to create a second read channel optimization process for said second temperature range;

means for performing said read channel optimization process for said second temperature range to create a read channel optimization parameter list for said second temperature range;

wherein said initial read channel optimization for said first temperature range is applicable to a sequence of at least two tracks on a disk surface within said disk drive;

wherein said read channel optimization for said second temperature range is applicable to said track sequence on said disk surface;

wherein said read channel optimization parameter list for said temperature range contains at least one member of a read channel parameter collection;

wherein said mechanism, is further comprised of:

means for said disk drive accessing any of said tracks belonging to said track sequence on said disk surface based upon said read channel optimization parameter list for said second temperature range whenever said disk drive is operating within said second temperature range;

wherein the means for performing said range read channel optimization process is further comprised of:

means for detecting when disk drive is idle and operating within said second temperature range;

means for incrementally performing read channel optimization whenever disk drive is idle and operating within said second temperature range to create a temporary read channel optimization with a temporary quality measure; and means for updating said read channel optimization for said second temperature range with said temporary read channel optimization whenever said temporary quality measure is better than a current quality measure for said track sequence.

2. The mechanism of claim 1, wherein the means for incrementally performing read channel optimization is further comprised of at least one member of the collection comprising:

means for starting a next step member whenever disk drive is idle and operating within said second temperature range to create a temporary read channel optimization with a temporary quality measure;

means for saving at least one result of said next step member whenever said next step member is completed;

means for pausing said next step member whenever at least one member of the collection is true, said disk drive is activated and said disk drive is turned off;

wherein said disk drive is activated if said disk drive is requested to access at least one of said disk surfaces.

3. The mechanism of claim 1, wherein said next step collection is comprised of:

means for performing a first Read Channel Optimization (RCO) step to determine a first read bias setting;

means for performing a second RCO step to determine a first write bias setting based upon said first read bias setting; and means for performing a third RCO step to determine a cut-off frequency based upon said first read bias setting and said first write bias setting.

4. The mechanism of claim 1, wherein said read channel parameter collection is comprised of: a read bias current, a write current, a write current overshoot control, a read channel cut-off frequency, a read channel amplification gain, an asymmetric balancing control, an Finite Impulse Response (FIR) tap list, an FIR enable, a servo track threshold value, and a servo track filter cut-off frequency.

5. The mechanism of claim 1, further comprising:

means for determining when said read channel optimization list matches an aging condition; and means for performing said read channel optimization process for at least one of said temperature ranges to update said read channel optimization parameter list for said temperature range whenever said read channel optimization list matches said aging condition;

wherein said aging condition pertains to at least one member of the collection comprising a time-from-manufacture condition and a time-from-last-update condition.

6. The mechanism of claim 1;

wherein said means are implemented including at least one member of the collection comprising: a channel interface, a computer, a memory accessibly coupled to said computer, a finite state machine, and an amplifier;

wherein said memory is comprised of a volatile memory component and a non-volatile memory component; and wherein said non-volatile memory component includes at least a version of said read channel optimization.

7. A method of self-vaccination providing optimized read channel parameters for a disk drive possessing a read channel optimization for a first temperature range, comprising the steps of:

determining said disk drive operating at a second temperature outside said first temperature range to create a read channel optimization process for said second temperature range;

performing said read channel optimization process for said second temperature range to create a read channel optimization parameter list for said second temperature range;

wherein said read channel optimization for said first temperature range is applicable to a sequence of at least two tracks on a disk surface within said disk drive;

wherein said read channel optimization for said second temperature range is applicable to said track sequence on said disk surface;

wherein said read channel optimization for said second temperature range contains a parameter list contains at least one member of a read channel parameter collection;

wherein said method, is further comprised of the step of:

said disk drive accessing any of said tracks belonging to said track sequence on said disk surface based upon said read channel optimization for said second temperature range whenever said disk drive is operating within said second temperature range;

wherein the step performing said read channel optimization process is further comprised of the steps of:

detecting when disk drive is idle and operating within said second temperature range;

incrementally performing read channel optimization whenever disk drive is idle and operating within said second temperature range to create a temporary read channel optimization with a temporary quality measure; and updating said read channel optimization for said second temperature range with said temporary read channel optimization whenever said temporary quality measure is better than a current quality measure for said track sequence.

8. The method of claim 7, wherein the step incrementally performing read channel optimization is further comprised of at least one member of the collection comprising the steps of:

starting a next step member whenever disk drive is idle and operating within said second temperature range to create a temporary read channel optimization with a temporary quality measure;

saving at least one result of said next step member whenever said next step member is completed;

pausing said next step member whenever at least one member of the collection is true, said disk drive is activated and said disk drive is turned off;

wherein said disk drive is activated if said disk drive is requested to access at least one of said disk surfaces.

9. The method of claim 7, wherein said next step collection is comprised of the steps of:

performing a first Read Channel Optimization (RCO) step to determine a first read bias setting;

performing a second RCO step to determine a first write bias setting based upon said first read bias setting; and performing a third RCO step to determine a cut-off frequency based upon said first read bias setting and said first write bias setting.

10. The method of claim 7, wherein said read channel parameter collection is comprised of: a read bias current, a write current, a write current overshoot control, a read channel cut-off frequency, a read channel amplification gain, an asymmetric balancing control, an Finite Impulse Response (FIR) tap list, an FIR enable, a servo track threshold value, and a servo track filter cut-off frequency.

11. The method of claim 7, further comprising the steps of:

determining when said read channel optimization list matches an aging condition; and performing said read channel optimization process for at least one of said temperature ranges to update said read channel optimization parameter list for said temperature range whenever said read channel optimization list matches said aging condition;

wherein said aging condition pertains to at least one member of the collection comprising a time-from-manufacture condition and a time-from-last-update condition.

12. Said disk drive of claim 7 incorporating said self-vaccination method comprising a collection of means for implementing each of the steps of claim 8;

wherein said means are implemented including at least one member of the collection comprising: a channel interface, a computer, a memory accessibly coupled to said computer, a finite state machine, and an amplifier;

wherein said memory is comprised of a volatile memory component and a non-volatile memory component; and wherein said non-volatile memory component includes at least a version of said read channel optimization.

13. A program system directing the execution of said self-vaccination of claim 7, as a collection of program steps residing in a memory accessibly coupled to a computer controlling said disk drive.

14. The apparatus of claim 13, wherein said disk drive includes said memory and said computer.

15. A method of self-vaccination providing optimized read channel parameters for a disk drive possessing a read channel optimization for a first temperature range, comprising the steps of:

determining when said read channel optimization matches an aging condition; and performing said read channel optimization process for at least one of said temperature ranges to update a read channel optimization parameter list for said temperature range whenever said read channel optimization list matches said aging condition;

wherein said aging condition pertains to at least one member of the collection comprising a time-from-manufacture condition and a time-from-last-update condition, wherein said read channel optimization for said first temperature range is applicable to a sequence of at least two tracks on a disk surface within said disk drive;

wherein said read channel optimization parameter list contains at least one member of a read channel parameter collection;

wherein the step performing said range read channel optimization process is further comprised of the steps of:

detecting when disk drive is idle and operating within said second temperature range;

incrementally performing read channel optimization whenever disk drive is idle and operating within said second temperature range to create a temporary read channel optimization with a temporary quality measure; and updating said read channel optimization for said second temperature range with said temporary read channel optimization whenever said temporary quality measure is better than a current quality measure for said track sequence.

16. The method of claim 15, further comprising the steps of:

determining said disk drive operating at a second temperature outside said first temperature range to create a second read channel optimization process for said second temperature range;

performing said read channel optimization process for said second temperature range to create a read channel optimization parameter list for said second temperature range;

wherein said read channel optimization for said second temperature range is applicable to said track sequence on said disk surface;

wherein said read channel optimization for said second temperature range parameter list contains at least one member of a read channel parameter collection;

wherein said method, is further comprised of the step of:

said disk drive accessing any of said tracks belonging to said track sequence on said disk surface based upon said read channel optimization for said second temperature range whenever said disk drive is operating within said second temperature range.

17. The method of claim 15, wherein the step incrementally performing read channel optimization is further comprised of at least one member of the collection comprising the steps of:

starting a next step member whenever disk drive is idle and operating within said second temperature range to create a temporary read channel optimization with a temporary quality measure;

saving at least one result of said next step member whenever said next step member is completed;

pausing said next step member whenever at least one member of the collection is true, said disk drive is activated and said disk drive is turned off;

wherein said disk drive is activated if said disk drive is requested to access at least one of said disk surfaces.

18. The method of claim 15, wherein said next step collection is comprised of the steps of:

performing a first Read Channel Optimization (RCO) step to determine a first read bias setting;

performing a second RCO step to determine a first write bias setting based upon said first read bias setting; and performing a third RCO step to determine a cut-off frequency based upon said first read bias setting and said first write bias setting.

19. The method of claim 15, wherein said read channel parameter collection is comprised of: a read bias current, a write current, a write current overshoot control, a read channel cut-off frequency, a read channel amplification gain, an asymmetric balancing control, an Finite Impulse Response (FIR) tap list, an FIR enable, a servo track threshold value, and a servo track filter cut-off frequency.

20. Said disk drive of claim 15 incorporating said self-vaccination method comprising a collection of means for implementing each of the steps of claim 18;

wherein said means are implemented including at least one member of the collection comprising: a channel interface, a computer, a memory accessibly coupled to said computer, a finite state machine, and an amplifier;

wherein said memory is comprised of a volatile memory component and a non-volatile memory component; and wherein said non-volatile memory component includes at least a version of said read channel optimization.

21. A program system directing the execution of said self-vaccination of claim 15, as a collection of program steps residing in a memory accessibly coupled to a computer controlling said disk drive.

22. The apparatus of claim 21, wherein said disk drive includes said memory and said computer.

* * * * *